Sept. 26, 1967  A. W. MOORE  3,343,443
BLIND RIVET ASSEMBLY
Filed Oct. 21, 1965  2 Sheets-Sheet 2
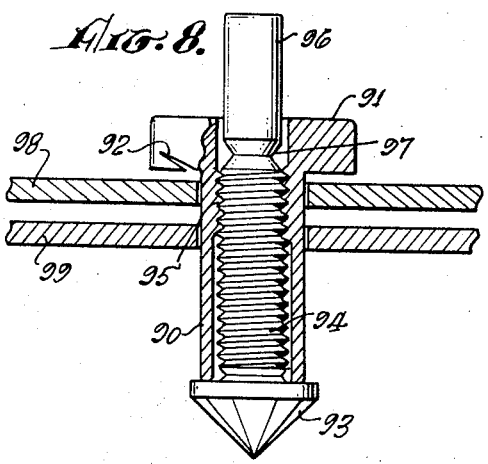
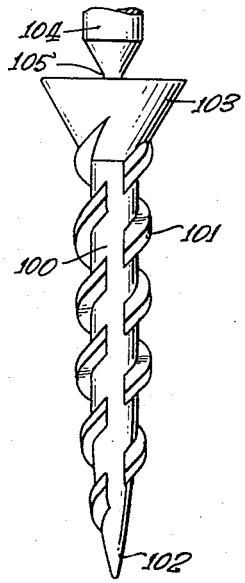
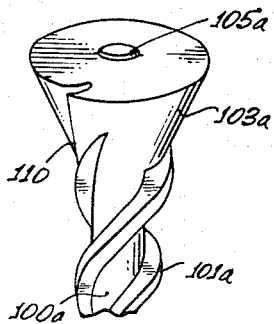
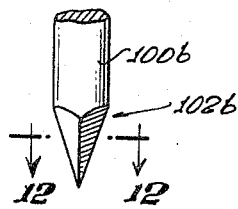
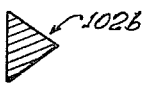
INVENTOR.
ANTHONY W. MOORE,
By Herbert C. Schulz
ATTORNEY.

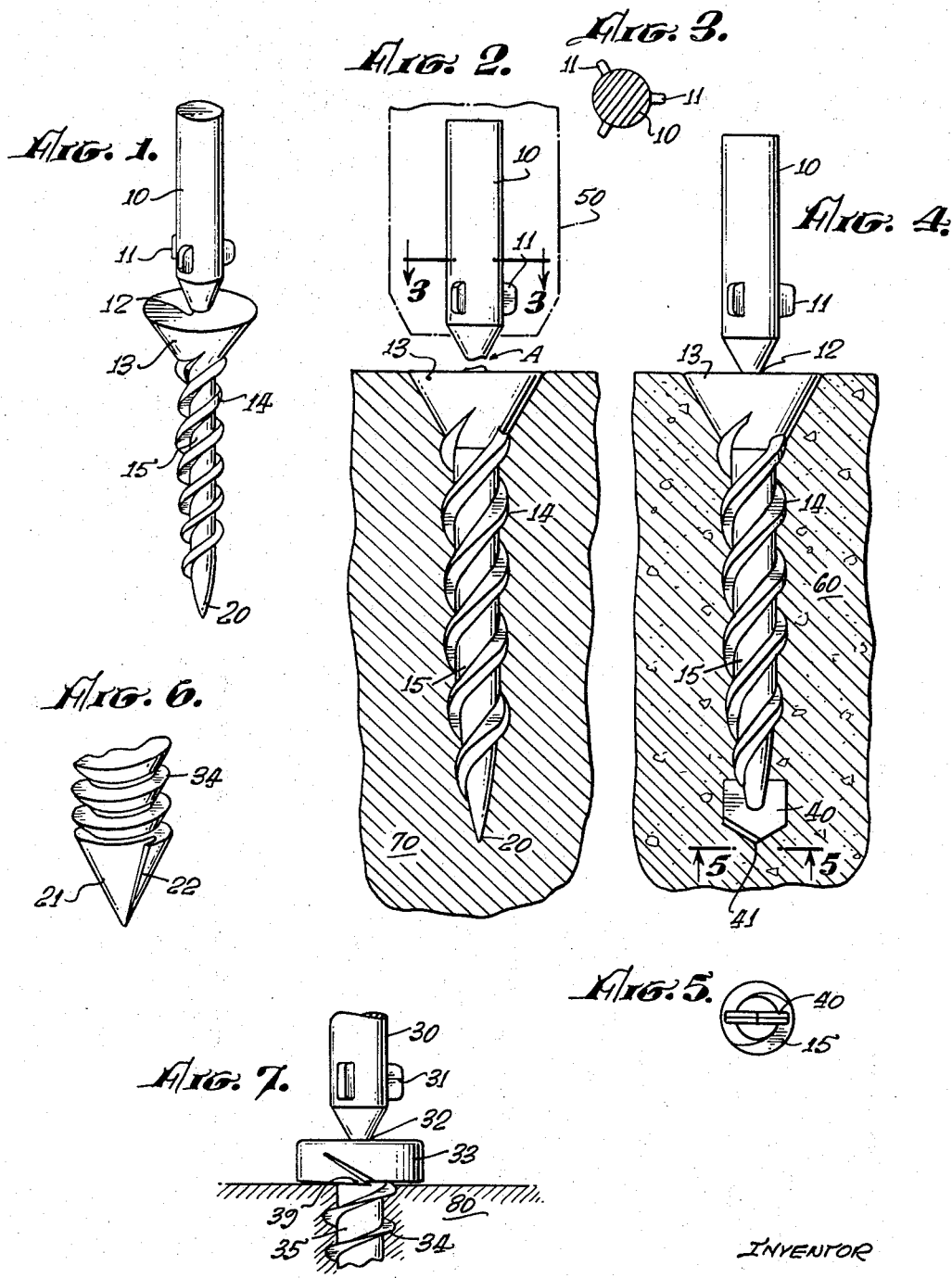

United States Patent Office 3,343,443
Patented Sept. 26, 1967

3,343,443
BLIND RIVET ASSEMBLY
Anthony W. Moore, 5173 Hallwood,
Riverside, Calif. 92506
Filed Oct. 21, 1965, Ser. No. 499,335
3 Claims. (Cl. 85—61)

This invention relates generally to screws and more particularly, to a new and improved screw having a frangible connecting shank.

In the field of fasteners in general, and screws of various kinds in particular, there have been numerous advances in the art at various times, including many attempts to make a suitable and effective screw which can be driven by a power device into a countersink position and leave a generally flat and flush head. In addition there have been attempts to make arrangements by which screws can be placed as desired in wood and metal with heads which form a pleasing finished surface and which will not become loose under vibration and the like. It has been desired to achieve a countersink screw which can form its own countersinking recess in the material being fastened.

Further, it has been desired to grasp a screw in a power device by a sure and effective means, yet one which eliminates danger of over-driving or causing damage to the material in which the screw is driven.

There are many patents in this important field which show various features of one type and another. However, I have not found any device which provides an effective means for grasping an extended shank detachably attached to the top of a fastening screw, with additional features including the ability to tap directly into the material being used and with the ability to be broken off and yet locked into position and the feature of being readily handled with ordinary small electric drills, hand drills or the like, and adaptability to a variety of fastening uses.

Thus it is an important object of the present invention to provide a screw with a frangible shank which is easily handled by an electric drill or the like.

It is a further object of this invention to provide such a screw which will be capable of pre-drilling its own pilot hole and at the same time providing its own countersink depression.

It is a further object of this invention to provide such a screw to be used with rivets.

The foregoing and other objects and advantages of this invention will be clear to those skilled in the art upon reading the following specification in conjunction with the attached drawings in which:

FIGURE 1 is a perspective of a preferred embodiment of one form of a screw of this invention;

FIGURE 2 is an elevational figure of the embodiment of FIGURE 1, in a piece of material, with the shank broken off after use;

FIGURE 3 is a sectionalized view through 3—3 on the shank of FIGURE 2;

FIGURE 4 is an alternative form of the screw of this invention indicating a self-drilling tip;

FIGURE 5 is an end view on 5—5 of FIGURE 4;

FIGURE 6 is a partial view of an alternative tip for this type of screw;

FIGURE 7 is a side elevation of the head of an alternate form of this invention incorporating a flat head with self-locking tabs;

FIGURE 8 is a sectionalized view of a rivet incorporating the frangible shank, locking tabs and self-drilling features of this invention;

FIGURE 9 is a side view of an alternative embodiment with self-tapping threads;

FIGURE 10 is a partial view of an alternative head for the screw of this invention having self-countersinking features;

FIGURE 11 is a partial view of an alternative tip for the screw of this invention; and FIGURE 12 is a section taken on 12—12 of FIGURE 11.

It will be observed that this device consists of a shank 10 having one or more lugs 11 as indicated so positioned as to be readily engaged in a Jacobs chuck on a small drill motor or the like or to be engaged by any special chuck for a hand brace or the like.

It will be observed that the shank is attached by a reduced diameter 12 to a head 13 which is also attached to a screw 20. The head may preferably be either a countersink head of the normal style or a countersink head having a cutting edge as indicated in FIGURE 10 for providing its own countersink depression and preferably it will have a special drill tip as indicated in FIGURES 4, 6 and 11 for drilling its own hole.

It will be observed in FIGURE 7 that in an alternate form there is shown a screw for use particularly in sheet metals or the like in which the head may have projections for causing positive locking after being drilled under pressure. It will be noted that the drill will cause the head to jam tightly against the material at which point the projection will be flattened, but will have a tendency to spring back and dig into the material if by vibration there should be any tendency to work loose.

It will be observed that there are many combinations and potentials illustrated in the various figures and it has not been possible to illustrate every conceivable arrangement; however, it is believed that a fair sampling has been indicated so that this invention can be thoroughly understood in its many ramifications.

In order to fully understand each of the details each figure will be described in detail below:

FIGURE 1 is a perspective view of one embodiment of this invention and comprises a shank 10 having lugs 11 which might be gripped by a chuck of a power drill or the like and having a solid connection at 12 to a screw 20. The connection at 12 will be seen to be a considerably reduced area which is a frangible portion which may break off under sufficient torque.

There is a head 13 and a customary screw shank 15 with threads 14.

FIGURE 2 illustrates the screw shown in FIGURE 1 in enlarged side view and shows particularly how the shank 10 being held by a chuck outlined in phantom lines 50 would hold the shank which would then break off at A as indicated when the screw was fully set.

In this illustration the screw has been shown placed into wood or the like 70 and when it has been fully driven in to where the head 13 is in firm contact the torque will cause the breaking of the shank at A.

FIGURE 3 is merely to illustrate in sections the shank with the tabs for easy gripping by a drill chuck or the like.

FIGURE 4 shows the identical embodiment and situation of FIGURE 2 but prior to the breaking off of the shank at 12 and with the addition of a drill tip 40 of carbide or the like. This is shown drilled into a substance such as masonry or the like which would otherwise be difficult to drill.

In the particular instance a somewhat confusing view may be thought to be exhibited when it is evident that the drill tip would be of sufficient width that theoretically there should be a hole through the material up to the first few threads.

This, however, has been so illustrated because of the fact that the material being drilled, in this case being a masonry material, would tend to flow back in around the screw in its abraded form and therefore a true hole would not exist. In this particular instance it will be noted that at 41 there have been sharpened edges on the drill points.

FIGURE 5 is merely for illustration from a bottom view of the drill tip indicated in FIGURE 4.

FIGURE 6 indicates another type of drill tip in which a threaded shank of a bolt 34 (the balance of the bolt above the point of break not being shown) terminates in a conical end 21 having a drill arrangement 22 capable of shaving out sections from wood and the like where a particular type and clean hole is desired.

FIGURE 7 illustrates a shank 30 having lugs 31, a reduced area 32 comparable to the reduced area 12 in the embodiment shown in FIGURE 1, a head 33 with tuck tabs 39 on its underside, shank 35 and threads 34 drilled into sheet metal or the like 80. In this case when full pressure is applied the shank will break at 32 and the tabs 39 having pointed ends will dig into the metal 80 or the like to prevent being shaken out by vibrations.

FIGURE 8 illustrates a rivet in which the rivet comprises a head 91 having locking tabs 92 similar to those shown in FIGURE 7 and threads at 95 with a tubular extension 90.

A shank 96 with a reduced area 97 and a threaded portion 94 extends through the tubular portion and the threads are engaged in threads 95. An enlarged drill portion 93 is attached to the threaded portion 94 and is in contact with the extended portion of the rivet 90.

In use, materials to be fastened together, such as two pieces of metal or the like 98 and 99, are placed in proximity to one another and the rivet is gripped by its shank 96 in the chuck of a drill or the like. The drill tip 93 comprising a plurality of hardened cutting edges drills its own hole through the two pieces 98 and 99 and thereafter the rivet is pressed through until the head 91 comes in contact with the material 98 and is held by the locking tip 92 against twisting. Thereafter as the shank 96 is continued in its rotation the enlarged drill tip 93 will pull back through the threads 95 and 94 and force the portion 90 to collapse outwardly to fasten the two pieces of sheet metal and the like together. Upon reaching its full compressive strength the shank will break off at the reduced portion 97.

FIGURE 9 illustrates a screw which is self tapping and which comprises a screw 100 having a pointed end 102 interrupted self tapping threads 101 a head 103 and a shank 104 with a reduced portion which will break at 105.

FIGURE 10 illustrates the head only of a device similar to the one shown in FIGURE 1 or in FIGURE 9 in which the shank has been broken off for clarity at 105A in which the shank of the screw is indicated as 100A and the thread indicated as 101A. The head 103A has a sharpened scalloped edge 110 which is capable of making its own countersink depression into soft materials.

FIGURES 11 and 12 illustrate a self drilling point for the various embodiments shown herein which comprises a generally triangular portion 102B at the end of the screw shank 100B.

In addition to the representations as shown it may sometimes be desirable to make a countersunk hole at the reduced portion 12 so that the shank will break below the surface of the head 13 or other head as the case may be. In this way any broken area will be depressed below the flush surface of the finished item after the screw has been placed.

Although the embodiments of this invention specifically shown and described in this application are fully capable of performing the objects and achieving the advantages desired, many modifications will be clear to those skilled in the art without departing from the inventive concepts disclosed herein. It is not my intention to be limited to the exact embodiments disclosed in this application.

I claim:

1. A rivet comprising an elongated hollow portion terminating at one end in a radially enlarged head, said elongated portion having internal threads adjacent said head and a deformable tubular extension adapted to extend beyond one side of members being joined together; a shank passing through said elongated hollow portion having threads over part of its length, said threads being engaged in the internal threads in said hollow portion, said shank having a reduced diameter portion defining an area of reduced strength adjacent the threaded portion near the enlarged head of said rivet, and a drill tip having a substantially flat base of greater diameter than the outside diameter of the tubular portion rigidly attached to said threaded portion at its other end and adjacent to said tubular portion, whereby said drill tip base is adapted to engage the end of said tubular portion upon rotation of the shank and to cause said tubular portion to collapse outwardly upon further rotation thereof.

2. The device of claim 1, in which the portion of the shank without thread is of a small enough diameter to pass through that part of the elongated hollow portion having threads without said unthreaded shank contacting or interfering with said threads.

3. The device of claim 2 in which said head has at least one locking tab depending downward to prevent turning in either direction in contact with material.

References Cited

UNITED STATES PATENTS

| 200,104 | 2/1878 | Stone | 85—61 |
|---|---|---|---|
| 1,084,643 | 1/1914 | Lasater | 85—43 |
| 1,188,305 | 6/1916 | Noerteman | 85—45 |
| 1,394,608 | 10/1921 | Davern. | |
| 1,465,148 | 8/1923 | Rosenberg | 85—47 |
| 1,887,616 | 11/1932 | Berge | 151—37 |
| 1,970,071 | 8/1934 | Bengtsson | 85—61 |
| 2,282,711 | 5/1942 | Eklund | 85—62 |
| 2,765,699 | 10/1956 | La Torre | 85—72 |
| 2,914,983 | 12/1959 | Kopf | 85—71 |
| 3,129,630 | 4/1964 | Wing et al. | 85—72 |
| 3,230,818 | 1/1966 | Siebol | 85—71 |

CARL W. TOMLIN, *Primary Examiner.*

R. S. BRITTS, *Assistant Examiner.*